United States Patent [19]
Friedline et al.

[11] 3,725,949
[45] Apr. 3, 1973

[54] PNEUMATIC INSTRUMENT SERVOMECHANISM

[75] Inventors: Leslie E. Friedline, Mentor; Thomas E. Stevenson, Willoughby Hills; Lee A. Weber, Mentor, all of Ohio

[73] Assignee: Bailey Meter Company, Croydon, Surrey, England

[22] Filed: Jan. 3, 1972

[21] Appl. No.: 214,676

[52] U.S. Cl. ...... 346/72, 74/110, 91/383, 91/387, 346/139 B
[51] Int. Cl. ............................................ G01d 5/42
[58] Field of Search..... 346/31, 32, 72, 139 B, 139 R; 73/419; 92/137; 91/387, 383, 3; 74/110, 89.22, 89.2; 137/557

[56] References Cited

UNITED STATES PATENTS

| | | | |
|---|---|---|---|
| 2,570,624 | 10/1951 | Wyckoff | 91/383 X |
| 2,995,116 | 8/1961 | Dobbins | 91/387 X |
| 3,595,085 | 7/1971 | Harrah | 346/139 R X |

*Primary Examiner*—Joseph W. Hartary
*Attorney*—Joseph M. Maquire

[57] ABSTRACT

A pneumatic servomechanism having a piston within a cylinder and fluid connections to the cylinder to introduce fluid pressure against either end of the piston so as to position the piston within the cylinder proportional to the difference in fluid pressure caused by a change in an input variable. A pulley system is attached to the piston by means of a cord connected to both ends of the piston and is proportionately rotated by the piston movement. A vane-nozzle differential fluid couple responsive to the rotation of the pulley system nulls the difference in pressure across the piston when the piston reaches a position corresponding to the change in the input variable.

10 Claims, 2 Drawing Figures

PNEUMATIC INSTRUMENT SERVOMECHANISM

BACKGROUND OF THE INVENTION

1. Field of the Invention

The present invention relates generally to a pneumatic servomechanism and, more particularly, to a pneumatic servomechanism employing a piston and cylinder assembly which responds to pressure differentials established by changes in an input variable from a reference value.

The invention is particularly applicable to pneumatic strip chart recorders and will be described with particular reference thereto although it will be appreciated that the invention has broader applications such as in linear responsive servocontrollers.

Description of the Prior Art

Many of the strip chart pen recorders heretofore available have utilized open loop, pen drive mechanisms. An inherent loss of accuracy is present in open loop operation, as contrasted with closed loop operation, which makes these conventional pen drive mechanisms undesirable.

Closed loop mechanisms are presently available which surpass the open loop mechanisms in accuracy, but they do not satisfy all of the requirements for a simple but rugged and compact servomechanism. Mechanisms of this type often utilize a single vane and nozzle assembly, the back pressure from which acts against a spring loaded rolling diaphragm to provide a linear output thereby. The power output and reaction times are mainly dependent upon the nozzle back pressure being applied to one side of the diaphragm and they are thereby limited in performance. These performed requirements are relevant in many modern chart recorder applications.

The pneumatic instrument servomechanism of the present invention provides closed loop operation which is required for improved accuracy as well as providing physical simplicity and compactness for efficient, economical, high density packaging.

SUMMARY OF THE INVENTION

In accordance with the present invention, there is provided a pneumatic servomechanism for linearly indicating the change of an input variable from a reference value which comprises: an elongated member having an axially extending inner chamber of uniform cross-sectional shape wherein a piston conforming thereto is slidably translated when a differential in pressure exists across the piston; means for supplying a differential in pressure across the piston in proportional response to the change of the input variable from the reference value; means for sealing the differential in pressure across the elongated member; means for converting the translational motion of the piston, relative to the elongated member into a proportional rotational output movement; and, means actuated by the converting means, for nulling the differential in pressure across the piston when the piston has been translationally displaced from the reference position to a new reference position linearly proportional to the change in the input variable from the reference value.

Further in accordance with the invention, the above described pneumatic servomechanism controls a string driven pen assembly positioned on movable chart paper in a pneumatic strip chart recorder which additionally includes an output driven pulley rotated in either direction by the converting means, the driven pulley engaging the string drive of the pen assembly to control the position of the pen relative to the chart paper as a linear function of the pneumatic input signal.

DESCRIPTION OF THE PREFERRED EMBODIMENT

Figure 1:
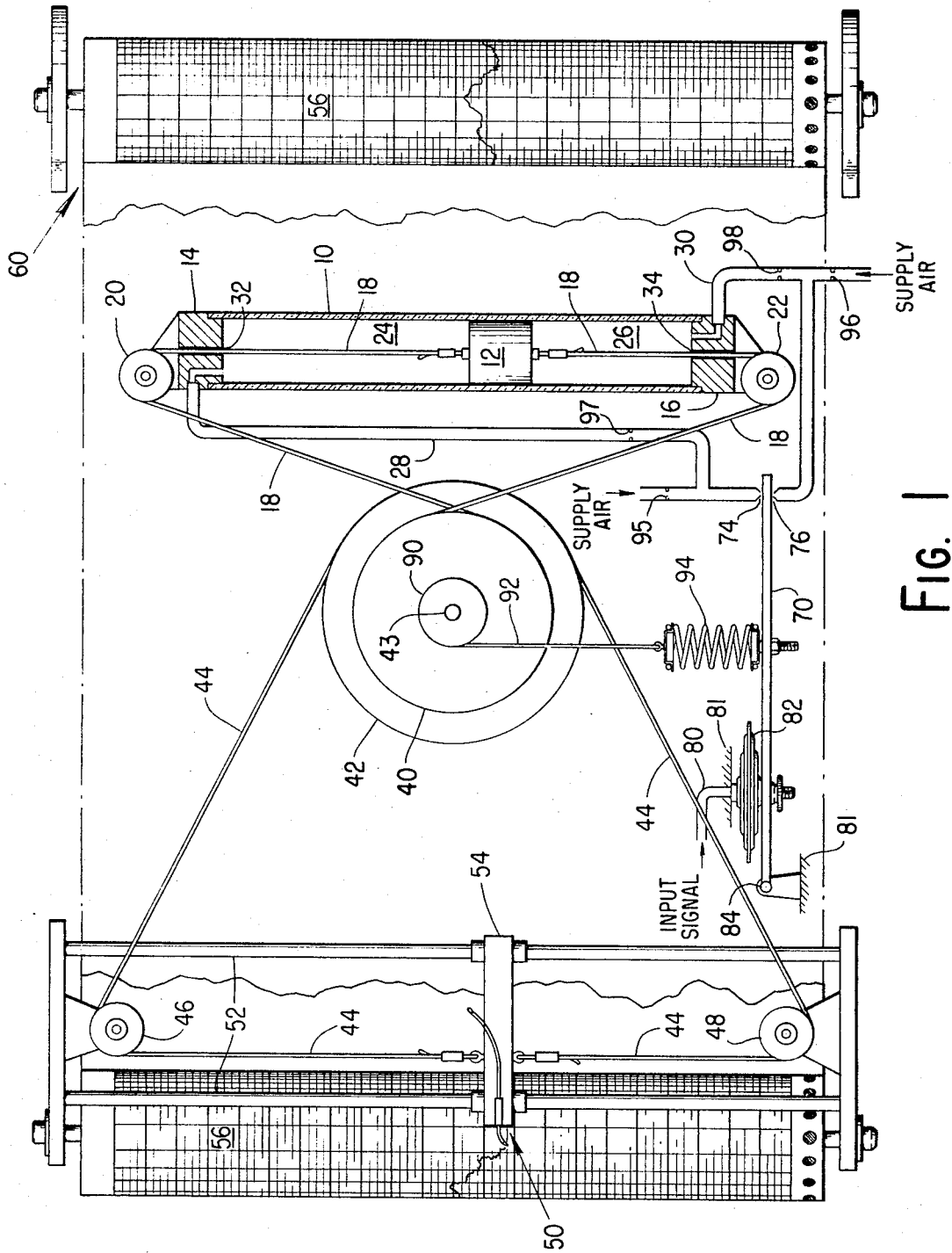
FIG. 1 is a functional schematic illustration of one preferred embodiment of the invention.

In reference to FIG. 1, there is illustrated a single pen strip chart recorder driven by a pneumatic servomechanism essentially comprised of a glass cylinder 10, a graphite piston 12, a dacron cord 18 and a pair of cylinder end pulleys 20, 22. The piston 12 is translationally positioned in the cylinder 10 by a differential in pressure of air entering chambers 24, 26 through supply air passages 28, 30 respectively. An unbalance in pressures in chambers 24, 26 is caused by a change of an input variable from a reference value which is supplied through a conduit 80 to a flexible signal capsule 82.

The translational movement of the piston 12 in response to a change in the input variable causes a proportional movement of a drive pulley 40, mounted on a shaft 43, by means of the cord 18 which is attached to each end of the piston 12. The rotational movement of drive pulley 40 causes a proportional rotational movement of a driven pulley 42 which is also mounted on shaft 43. The movement of the driven pulley 42 is transmitted to a pen assembly 50 of a pen carriage 54 by a cord 44 which passes over a pair of guide pulleys 46, 48 and attaches to the pen assembly 50. The translational movement of the pen assembly 50, along a pair of guide rods 52, produces an inked record on a roll of movable chart paper 56 which represents the change of the input variable with respect to time. A chart takeup assembly 60 accepts and stores the recorded chart paper.

The value of the input variable is transmitted from a remote pneumatic transducer (not shown) through the conduit 80 to the signal capsule 82. One end of the capsule 82 is mounted on a suitable support 81, and the movable end of the capsule is attached to a movable vane 70. The vane 70 is positioned between a pair of nozzles 74, 76 and is caused to pivot on a flexural hinge 84 by the expansion or contraction of the capsule 82 in response to changes in signal pressure. The relationship of the vane 70 to the nozzles 74, 76 forms a differential fluid couple. The operation of a vane-nozzle fluid couple is well known to those skilled in the art, therefore, the discussion of the vane-nozzle configuration will be limited to its function in the pneumatic servomechanism.

The pressure integrity of the cylindrical chambers 24, 26 is provided by establishing sufficient clearance to permit the unrestricted movement of the piston 12 therewithin while the cord 18 passes through respective passages 32, 34 in each of a pair of cylinder end caps 14, 16. The cord substantially fills the passages 32, 34 thus substantially eliminating the leakage of air from the chambers through the passages.

The selection of glass tubing for the cylinder and a graphite rod for the piston minimizes the efforts required to maintain close accurate tolerances. The selection of graphite as the piston material reduces the coefficient of friction with the glass cylinder to a minimum thereby insuring fast, smooth piston response to changes in the input variable.

The nozzle 74 communicates with the chamber 24 through the air passage 28 having constricting orifices 95, 97 through which supply air flows. Similarly, the nozzle 76 communicates with the chamber 26 through the air passage 30 having constricting orifices 96, 98 through which supply air flows. The purpose for these orifices will be described subsequently.

At steady state input signal conditions, the vane 70 is balanced between the nozzle 74, 76 such that the supply air being vented through the nozzles 74, 76 is restricted in a manner that creates a back pressure in the chambers 24, 26 which establishes a small difference in pressure across piston 12 which is sufficient to balance the force of a range spring 94 coupled to pulley 40. Under these conditions, the differential air pressure in chambers 24, 26 maintains the piston 12 stationary.

Assume, however, that this balance condition is upset by an increase in input signal pressure in the conduit 80 so as to result in the expansion of the signal capsule 82. The expansion of the signal capsule 82 will cause the vane 70 to move away from nozzle 74 and toward nozzle 76. This vane movement reduces the quantity of supply air vented through nozzle 76 and thereby increases the supply air back pressure in chamber 26. The same vane movement also increases the quantity of supply air vented through nozzle 74 and thereby decreases the supply air back pressure in chamber 24. The pressure differential between chambers 24, 26 caused by the movement of vane 70 results in the movement of piston 12 from the chamber of higher pressure 26 into the lower pressure chamber 24. The resulting upward movement of piston 12 to which a cord 18 is attached causes a clockwise rotational movement of pulleys 40, 42 and this, in turn, causes the proportional positioning of pen assembly 50 as a linear function of the input variable.

A decrease in signal pressure in the capsule 82 causes the vane 70 to move away from nozzle 76 and toward nozzle 74. The back pressure in chamber 24 is thereby increased and the back pressure in chamber 26 decreased causing piston 12 to move from the higher pressure chamber 24 into the lower pressure chamber 26. The resulting downward piston movement of the piston 12 causes a counter-clockwise rotation of pulleys 40, 42 to linearly position the pen assembly 50.

A tape drum 90 is also mounted on the pulley shaft 43. A tape 92 is attached at one end to the drum 90 and wound thereabout, the other end of the tape being connected to the range spring 94. The spring 94 is secured to vane 70 and reacts to drum rotation caused by a change in input signal pressure thus limiting the movement of vane 70. The spring 94 has a spring constant which exerts a restoring force on the vane 70 in order to reestablish vane-nozzle balance after the pen assembly 50 has been displaced a distance linearly proportional to the change in input signal pressure. This balancing of the vane-nozzle configuration sets the pressure differential between chambers 24, 26 causing the piston 12 to come to rest in a new steady state position corresponding to the value of the input variable.

The constricting orifice 97 in the air passage 28 and the constricting orifice 98 in the air passage 30 are positioned downstream of the respective nozzles. The orifices 97, 98 are provided to prevent recorder pen overshoot, and they perform this function by slowing the change in cylinder pressure response due to changes in the input signal pressure. This insures a uniform speed of response of the pen assembly for both increasing and decreasing input pressure signals.

Constricting orifices 95, 96 are provided upstream of the respective nozzles to restrict the supply air flow in such a manner as to provide a predetermined relationship between vane-nozzle clearance and chamber back pressure.

Figure 2:
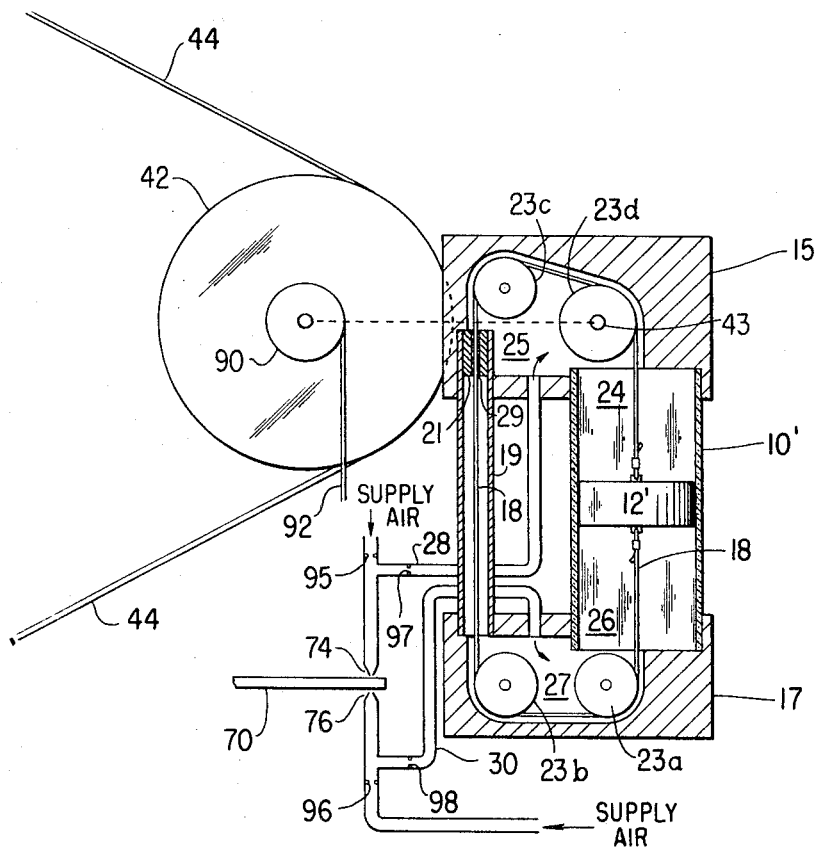
FIG. 2 is a cross-section of an alternative piston and cylinder assembly from that of FIG. 1.

Referring now to FIG. 2, showing another embodiment of the invention and wherein like numbering signifies like structure to that of FIG. 1, a string seal tube 19 having a seal plug 21 is located parallel to the cylinder 10' which is here shown to be of somewhat reduced length but increased diameter for greater power relative to the glass cylinder shown as 10 in FIG. 1. Piston 12' is designed to match this larger cylinder. Seal caps 15, 17 are attached to opposite ends of the cylinders 10', 19 sealing them from ambient pressure thereby. The chamber 24 communicates with supply air passage 28 through a passageway 25 located within the seal cap 15. Similarly chamber 26 communicates with supply air passage 30 through a passageway 27 located within the seal cap 17. The chamber 24 is isolated from chamber 26 by the seal plug 21.

Located within cap 17, are guide pulleys 23a, 23b in a manner that seals them from the ambient atmosphere. Similarly, located within cap 15 are guide pulleys 23c, 23d. External to end cap 15 is located a driven pulley 42 with a shaft 43 extending through the seal cap 15 and being coupled to pulley 23d so as to maintain the seal of the passageway 25 while pulleys 23d, 42 and the shaft 43 rotate. The cord 18 is aligned through the guide pulleys 23, thereby connecting the opposite ends of the piston 12'. The cord 18 extends through a hole 29 in the seal plug 21 substantially filling the hole 29 and maintaining the seal between passageways 25, 27 thereby and thus maintaining the pressure integrity of chambers 24 and 26.

Supply air passages 28, 30 communicate with passages 25, 27 respectively, and the operation of this servomechanism is similar to that described with reference to FIG. 1 and will, therefore, not be repeated.

It will be understood that the strip chart recorder described with reference to FIG. 1 would operate in a similar manner with the driven pulley 42 and the drum 90 attached or coupled to the shaft 43 extending from the seal cap 15.

Certain modifications and additions will become obvious to those skilled in the art upon reading this specification. It is intended that all such obvious modifications and additions be included herein.

What we claim as new and desire to secure by Letters Patent of the United States is the following:

1. A pneumatic servomechanism for linearly indicating the change of an input variable from a reference value, comprising:
   an elongated member having an axially extending inner chamber of uniform cross-sectional shape;
   a piston within the chamber of said elongated member, said piston having a cross-section conforming to the cross-sectional shape of the chamber, said piston being slidably translated therewithin to either side of a reference position when a differential in pressure exists across said piston;
   means for supplying a differential in pressure across said piston in proportional response to the change of the input variable from the reference value to translationally slide said piston in either direction from the reference position in the chamber;
   means for sealing the differential in pressure across said elongated member;
   means, including a drive cord connected to said piston for converting the translational motion of said piston, relative to said elongated member, into a proportional rotational output movement; and,
   means, actuated by said converting means, for nulling the differential in pressure across said piston when said piston has been translationally displaced from the reference position to a new reference position linearly proportional to the change in the input variable from the reference value.

2. The pneumatic servomechanism of claim 1, wherein said means for converting the translational motion of said piston into proportional rotational output movement includes:
   a guide pulley assembly mounted internally of said sealing means and in an alignment plane with the axis of said elongated member;
   an output guide pulley assembly mounted internally of said sealing means proximate the opposite end of said elongated member in the same alignment plane and having an output shaft sealably extending from said sealing means, said piston drive cord being continuous within said sealing means and being engaged in said output guide pulley assembly and in said guide pulley assembly to rotate said output shaft proportionally to piston translation.

3. The pneumatic servomechanism of claim 1, wherein said elongated member is a cylindrical glass tube and said piston is a carbon rod.

4. The pneumatic servomechanism of claim 1, wherein said pressure supplying means includes;
   a support;
   a flexible capsule responsive to the change of the input variable, one side of the capsule being attached to said support, said capsule expanding when the input variable increases and contracting when the input variable decreases;
   a vane-nozzle differential fluid couple with one end of the vane pivotally mounted on said support and the other end of the vane interposed between opposed first and second nozzles, said vane being attached to the other side of said capsule to regulate back pressure in said nozzles as a function of the polarity and magnitude of the input variable;
   a first supply fluid conduit communicating with said first nozzle and with one end of the chamber in said elongated member; and,
   a second supply fluid conduit communicating with said second nozzle and with the other end of the chamber in said elongated member so that the differential pressure across said piston is controlled by said vane-nozzle fluid couple.

5. The pneumatic servomechanism of claim 4, wherein said first and second supply fluid conduits each include a constricting orifice downstream of said nozzles to minimize the effect of sudden pressure surges and to insure a uniform response of said piston to both increasing and decreasing input variables.

6. The pneumatic servomechanism of claim 4, wherein said first and second supply fluid conduits each include a constricting orifice upstream of said nozzles to regulate back pressure caused by said vane-nozzle fluid couple.

7. The pneumatic servomechanism of claim 4, wherein said means for converting the translational motion of said piston into proportional rotational output movement includes:
   a first pulley mounted proximate to one end of said elongated member;
   a second pulley mounted proximate to the other end of said elongated member; and,
   an output drive pulley mounted to said support between said first and second pulleys, said piston drive cord being engaged in said output drive pulley and riding in said first and second pulleys to rotate said output drive pulley in either direction proportional to piston translation.

8. The pneumatic servomechanism of claim 7, wherein said nulling means includes:
   a tape drum coupled to the shaft of said output drive pulley and fixed to rotate therewith, said drum including a non-resilient tape coiled thereabout with the inner end fixed to said drum; and,
   a spring having one end connected to said vane and the other end of said spring being connected to the outer end of said tape so that said spring reacts to the rotation of said drum in either direction to balance said vane relative to said nozzles after said output drive pulley has rotated proportional to the change in the input variable.

9. The pneumatic servomechanism of claim 7, wherein said sealing means for one end of the chamber in said elongated member is integrally formed to mount said first pulley and to admit the end of said first supply fluid conduit, downstream of said first nozzle, to the end of the chamber in said elongated member.

10. A pneumatic strip chart recorder having a string driven pen assembly positioned on movable chart paper as a linear function of a pneumatic input signal representing a measured variable, comprising:
   an elongated member having an axially extending inner chamber of uniform cross-sectional shape;
   a piston within the chamber of said elongated member, said piston having a cross-section conforming to the cross-sectional shape of the chamber, said piston being slidably translated therewithin to either side of a reference position when a differential in pressure exists across said piston;

means for supplying a differential in pressure across said piston in proportional response to the change of the input variable from the reference value to translationally slide said piston in either direction from the reference position in the chamber;

a pressure seal at each end of the chamber, each said seal having a passage proximate to the chamber and said piston;

means, including a drive cord connected to said piston through the passage in each of said end seals for converting the translational motion of said piston, relative to said elongated member, into a proportional rotational output movement, said drive cord located in said seal passages to maintain pressure communicated to the chamber;

means, actuated by said converting means, for nulling the differential in pressure across said piston when said piston has been translationally displaced from the reference position to a new reference position linearly proportional to the change in the input variable from the reference value; and, an output driven pulley rotated in either direction by said converting means, said driven pulley engaging the string drive of the pen assembly to control the position of the pen relative to the chart paper as a linear function of the pneumatic input signal.

* * * * *